(12) United States Patent
Lin

(10) Patent No.: US 12,441,430 B2
(45) Date of Patent: Oct. 14, 2025

(54) GRIP STRUCTURE

(71) Applicant: GIANT MANUFACTURING CO., LTD., Taichung (TW)

(72) Inventor: Chia-Wei Lin, Taichung (TW)

(73) Assignee: GIANT MANUFACTURING CO., LTD., Taichung (TW)

( * ) Notice: Subject to any disclaimer, the term of this patent is extended or adjusted under 35 U.S.C. 154(b) by 0 days.

(21) Appl. No.: 18/309,828

(22) Filed: Apr. 30, 2023

(65) Prior Publication Data

US 2023/0348012 A1 Nov. 2, 2023

(30) Foreign Application Priority Data

May 2, 2022 (TW) ................................. 111204514

(51) Int. Cl.
*B62K 21/26* (2006.01)

(52) U.S. Cl.
CPC .................................. *B62K 21/26* (2013.01)

(58) Field of Classification Search
None
See application file for complete search history.

(56) References Cited

U.S. PATENT DOCUMENTS

| 11,242,112 | B2 * | 2/2022 | Graetz | B62K 21/26 |
| 2012/0073400 | A1 * | 3/2012 | Wang | B62K 21/26 |
| | | | | 74/551.9 |

FOREIGN PATENT DOCUMENTS

| CN | 101190378 A | * | 6/2008 | A01K 87/08 |
| CN | 202827949 U | * | 3/2013 | |
| GB | 477290 A | * | 6/1937 | B62K 21/26 |

* cited by examiner

*Primary Examiner* — Vicky A Johnson
(74) *Attorney, Agent, or Firm* — CKC & Partners Co., LLC

(57) ABSTRACT

A grip structure includes an inner tube, a cushioning layer, a gripping layer and a locking component. The cushioning layer is connected to an outer surface of the inner tube. The gripping layer is connected to an outer surface of the cushioning layer. The locking component is disposed at one end of the grip structure and is connected to the inner tube. The locking component is configured to connect the grip structure to an external device. A section of the grip structure is an eccentric.

13 Claims, 5 Drawing Sheets

GRIP STRUCTURE

RELATED APPLICATIONS

This application claims priority to Taiwan Application Serial Number 111204514, filed May 2, 2022, which is herein incorporated by reference.

BACKGROUND

Technical Field

The present disclosure relates to a grip structure. More particularly, the present disclosure relates to a grip structure with shock-absorbing and lightweight effects, which can increase the grip comfort of the user.

Description of Related Art

With the improvement of people's quality of life, sports have become a necessary part of many people's lives. Cycling can not only be used as a leisure activity, but can also be used as a means of transportation, so it has become a popular sport.

However, when riding a bicycle, the hand muscles of a rider can easily feel fatigued from the prolonged vibrations transmitted to the grips from the front wheel, thereby reducing the control of the rider over the grips and increasing the risk of accidental injury to the rider.

Therefore, the development of a grip structure with both shock-absorbing and lightweight effects, as well as increases the grip comfort of the user, is important.

SUMMARY

According to one aspect of the present disclosure, a grip structure is provided. The grip structure includes an inner tube, a cushioning layer, a gripping layer and a locking component. The cushioning layer is connected to an outer surface of the inner tube. The gripping layer is connected to an outer surface of the cushioning layer. The locking component is disposed at one end of the grip structure and is connected to the inner tube. The locking component is configured to connect the grip structure to an external device. A section of the grip structure is an eccentric.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
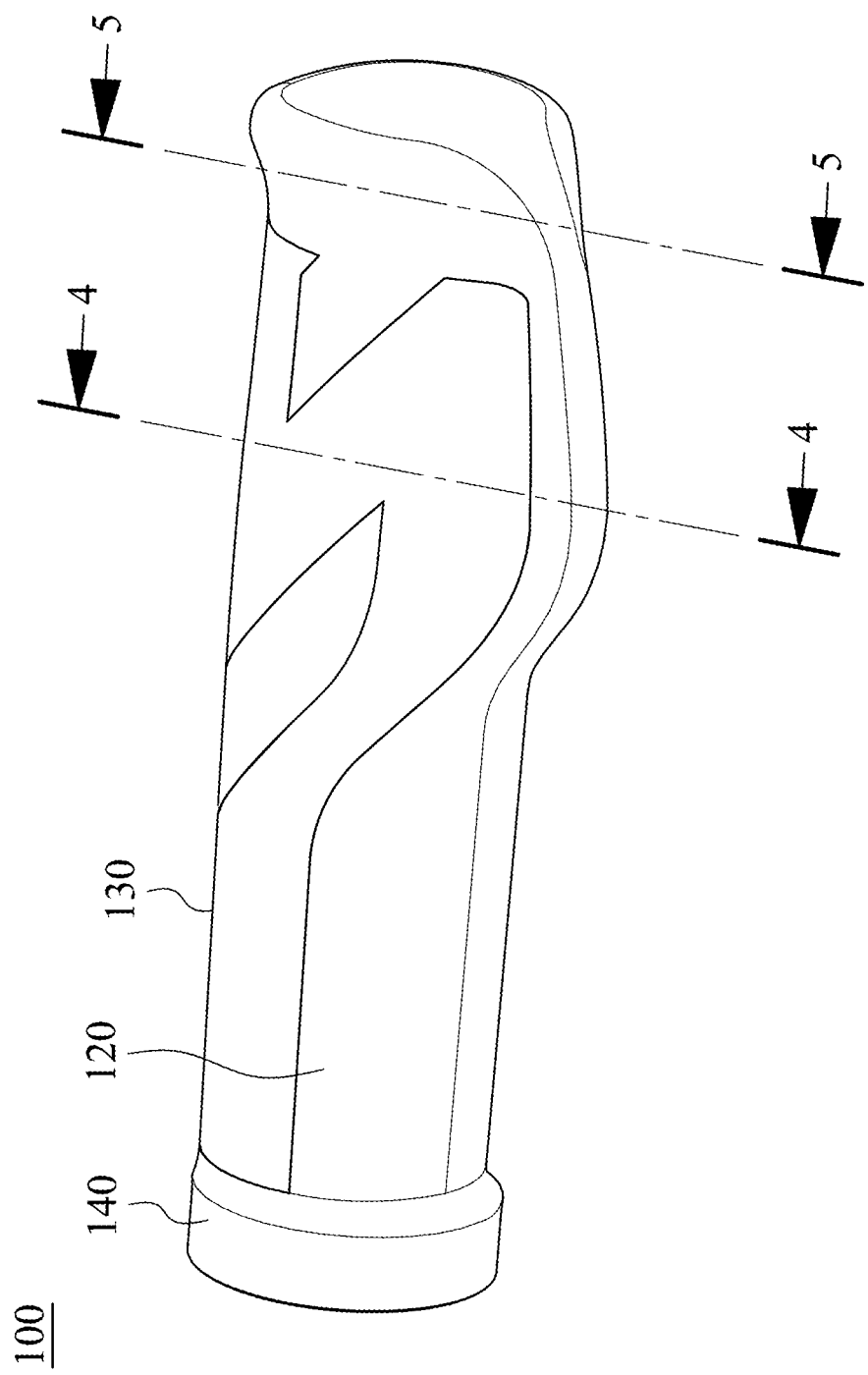
FIG. 1 is a perspective view of a grip structure according to one embodiment of the present disclosure.

Reference will now be made in detail to the present embodiments of the present disclosure, examples of which are illustrated in the accompanying drawings. Wherever possible, the same reference numbers are used in the drawings and the description to refer to the same or like parts.

Figure 2:
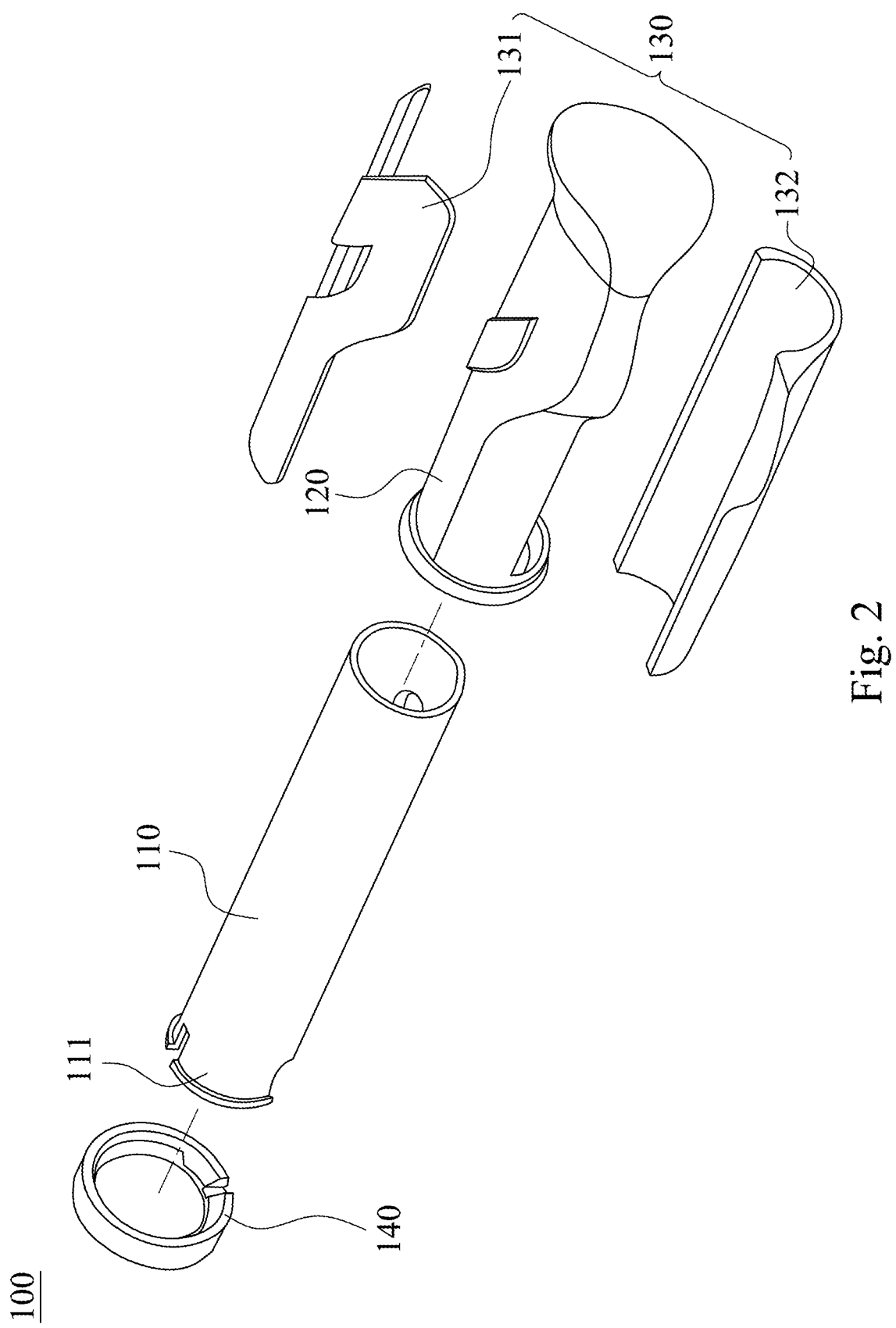
FIG. 2 is an exploded view of the grip structure shown in FIG. 1.

Reference is made to FIG. 1 and FIG. 2. FIG. 1 is a perspective view of a grip structure 100 according to one embodiment of the present disclosure. FIG. 2 is an exploded view of the grip structure 100 shown in FIG. 1. The grip structure 100 includes an inner tube 110, a cushioning layer 120, a gripping layer 130 and a locking component 140. The cushioning layer 120 is connected to an outer surface of the inner tube 110. The gripping layer 130 is connected to an outer surface of the cushioning layer 120. The locking component 140 is disposed at one end of the grip structure 100 and is connected to the inner tube 110. The locking component 140 is configured to connect the grip structure 100 to an external device. A section of the grip structure 100 is an eccentric.

In greater detail, the inner tube 110 provides support for the grip structure 100 of the present disclosure, so the inner tube 110 can be made of a hard material. The material used for the inner tube 110 can be an engineering plastic or a metal, but the present disclosure is not limited thereto.

The cushioning layer 120 provides cushioning and shock-absorbing effects for the grip structure 100 of the present disclosure, so the cushioning layer 120 can be made of a soft material with low hardness. The material used for the cushioning layer 120 can be a low hardness thermoplastic rubber, but the present disclosure is not limited thereto.

The gripping layer 130 provides a comfortable grip and support effect for the grip structure 100 of the present disclosure. The gripping layer 130 can have at least one exposed surface, whereby the force of the user can be evenly distributed to the cushioning layer 120, so that the cushioning layer 120 can be deformed to achieve a shock-absorbing effect and can provide an appropriate anti-slip effect to increase safety. The gripping layer 130 can be made of a soft material with high hardness, and a hardness of the cushioning layer 120 can be less than a hardness of the gripping layer 130. The material used for the gripping layer 130 can be a high hardness thermoplastic rubber, but the present disclosure is not limited thereto.

The locking component 140 is configured to connect the grip structure 100 to an external device. Furthermore, as shown in FIG. 1 and FIG. 2, the inner tube 110 can have a connecting portion 111, and the connecting portion 111 protrudes from one end of the cushioning layer 120 and is not covered by the cushioning layer 120. The locking component 140 is sleeved on the connecting portion 111 of the inner tube 110. In this way, the convenience of removing and replacing the grip structure 100 with the external device can be increased.

Figure 3:
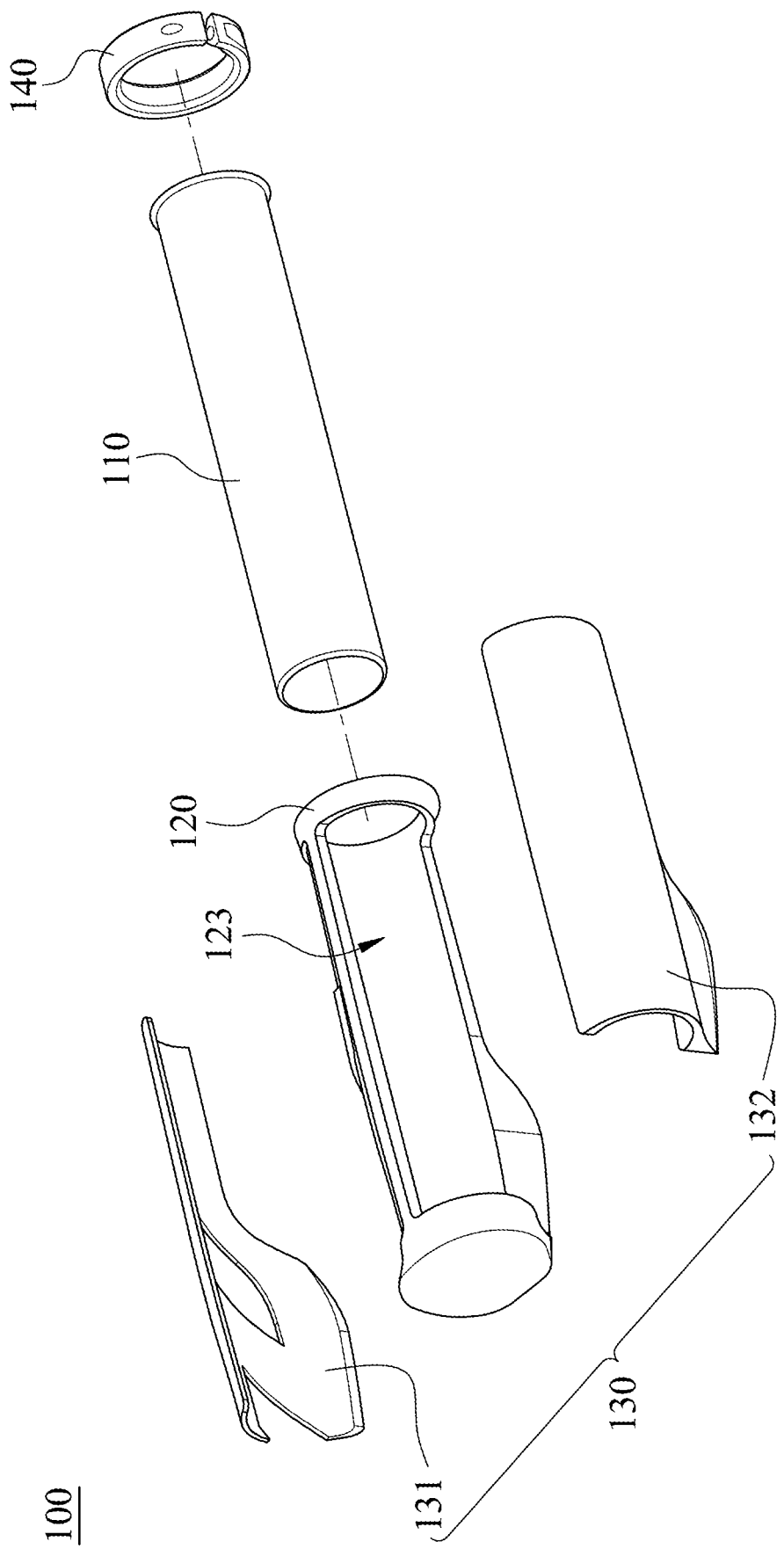
FIG. 3 is another exploded view of the grip structure shown in FIG. 1.
Figure 4:
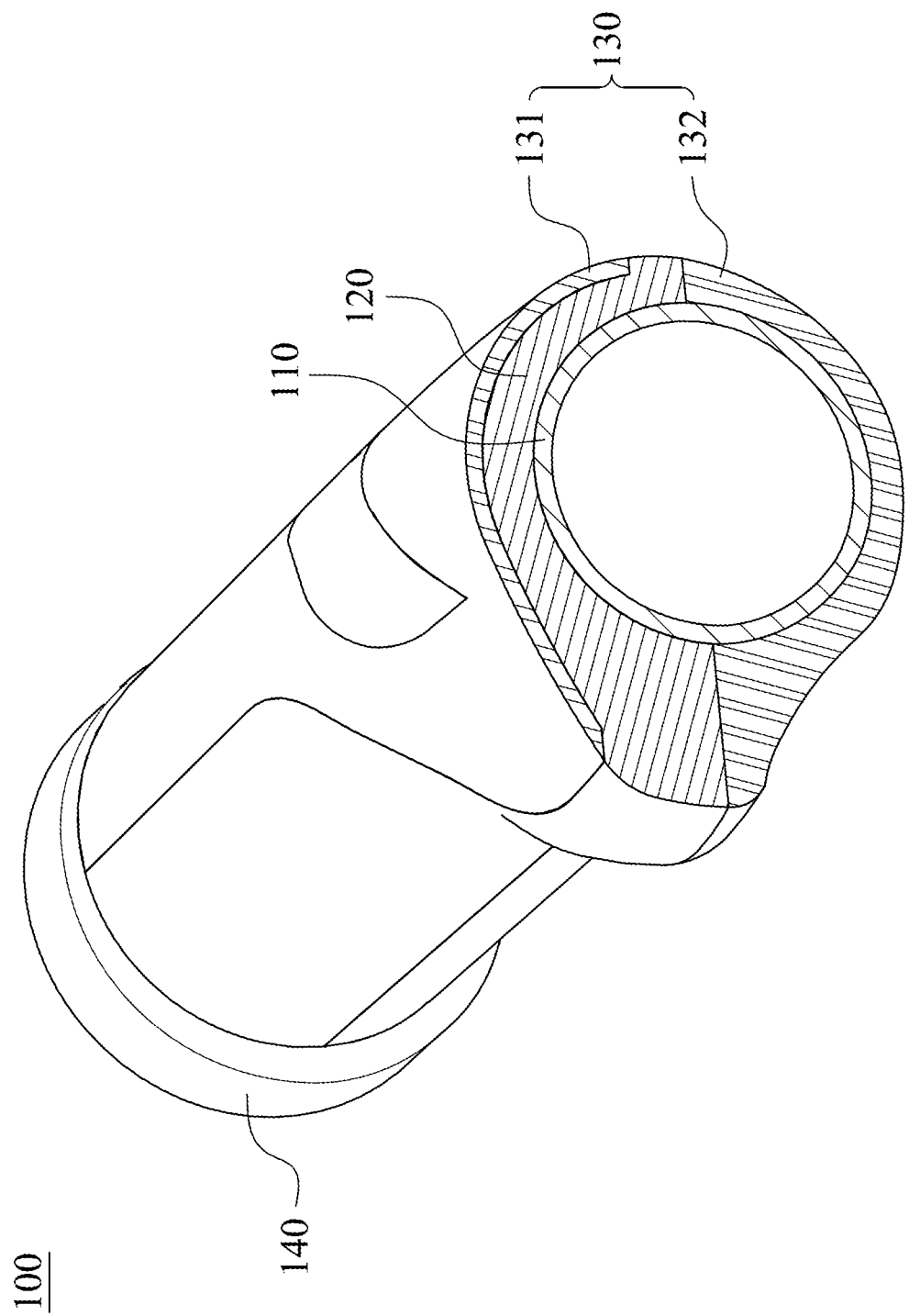
FIG. 4 is a cross-sectional view of the grip structure taken along line 4-4 shown in FIG. 1.
Figure 5:
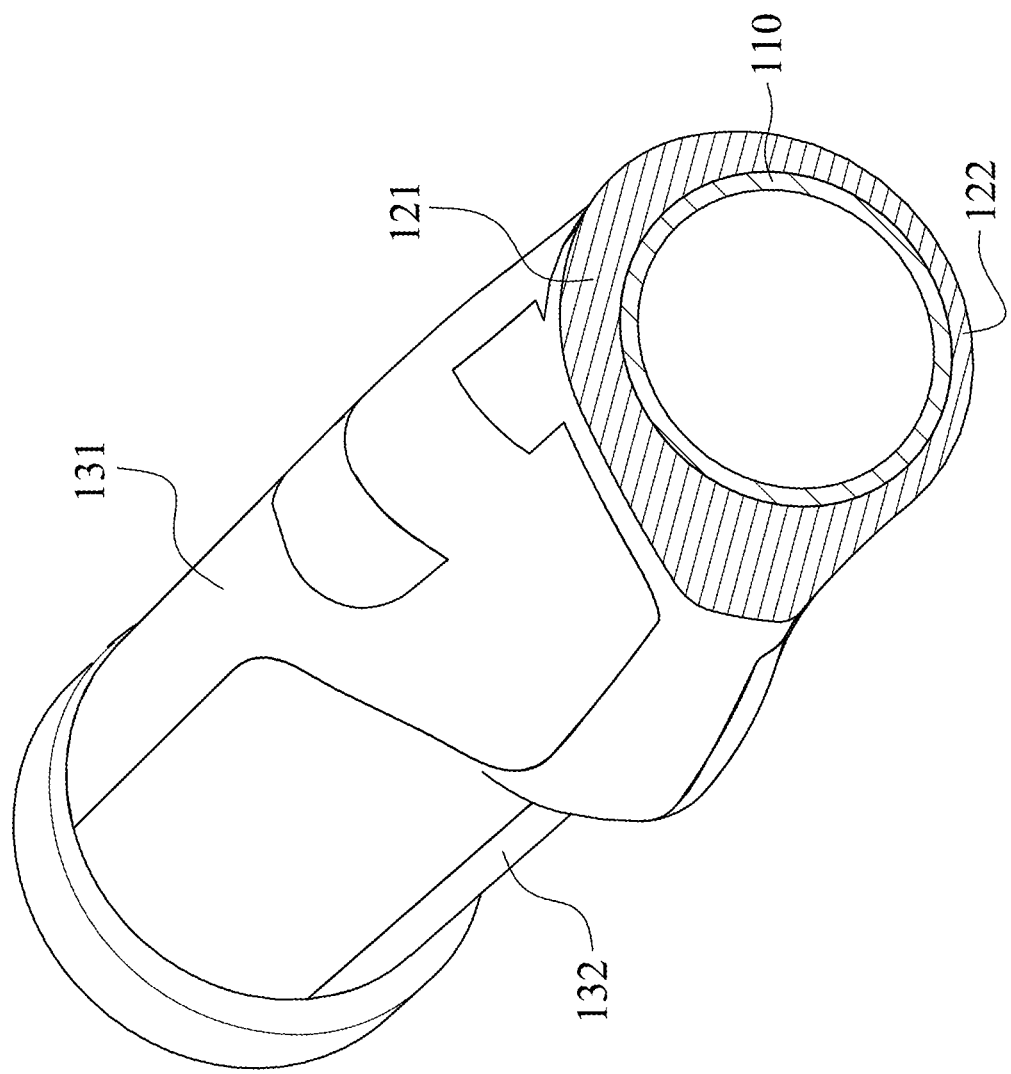
FIG. 5 is a cross-sectional view of the grip structure taken along line 5-5 shown in FIG. 1.

Reference is made to FIG. 3, FIG. 4 and FIG. 5. FIG. 3 is another exploded view of the grip structure 100 shown in FIG. 1. FIG. 4 is a cross-sectional view of the grip structure 100 taken along line 4-4 shown in FIG. 1. FIG. 5 is a cross-sectional view of the grip structure 100 taken along line 5-5 shown in FIG. 1. As shown in FIG. 4 and FIG. 5, the cushioning layer 120 can have a first side 121 and a second side 122, and a thickness of the cushioning layer 120 gradually increases from the second side 122 to the first side 121. In greater detail, since the first side 121 has a thicker thickness, more cushion space can be obtained, so that the first side 121 can withstand greater impact force and greater vibration and can provide a good shock-absorbing effect when the grip structure 100 is used. In addition, the volume of the cushioning layer 120 of the grip structure 100 of the present disclosure can be increased without affecting the overall thickness of the grip structure 100, so as to obtain more cushion space. Compared with the conventional grip structure with the cushioning layer of the same thickness at each position, the amount of materials used for the cushioning layer 120 of the grip structure 100 of the present disclosure can be reduced, which can prevent the grip structure 100 from being too thick to affect the gripping effect. The grip structure 100 can achieve the effects of saving material waste, reducing production cost and reducing weight while having excellent shock-absorbing effect.

As shown in FIG. 2 and FIG. 3, the gripping layer 130 can include a first gripping part 131 and a second gripping part 132. The first gripping part 131 is disposed on the first side 121, and the second gripping part 132 is disposed on the second side 122. Further, the cushioning layer 120 can have a hollow part 123 formed on the second side 122 of the cushioning layer 120, and the second gripping part 132 is disposed on the hollow part 123. As shown in FIG. 4, the second gripping part 132 can be attached to the outer surface of the inner tube 110, and the first gripping part 131 can be attached to the outer surface of the cushioning layer 120. Thereby, a section of the grip structure 100 is an eccentric by an asymmetric structural configuration of the cushioning layer 120 and the gripping layer 130. An eccentric distance of the grip structure 100 can be 0.5 mm to 5 mm.

The grip structure 100 can provide different grip feeling and effects with the above structural configuration. Taking the application of the grip structure 100 to the bicycle as an example, when riding the bicycle, the part where the user mainly feels a relatively large impact or vibration lies in the palm of the hand of the user. Therefore, the first side 121 of the grip structure 100 of the present disclosure can be configured on the side of the grip structure 100 away from the ground (that is, the side of the grip structure 100 close to the palm of the hand of the user), and the second side 122 of the grip structure 100 of the present disclosure can be configured on the side of the grip structure 100 close to the ground side (that is, the side away from the palm of the hand of the user). In this way, the cushioning layer 120 is surrounded by the first gripping part 131 and the inner tube 110 on the first side 121. When the user holds the grip structure 100, the grip structure 100 can provide the user with a comfortable grip feeling and sufficient support in the palm of the hand, thereby achieving good shock-absorbing and cushioning effect. In addition, since the second gripping part 132 is closely attached to the inner tube 110 on the second side 122, which can provide a solid grip feeling and can further increase the grip force. Furthermore, the position of the grip structure 100 can be adjusted by the user, so that the cushioning layer 120 can be adjusted to correspond to the most appropriate position of the palm of the hand of the user to increase the grip comfort of the user.

In particular, the present disclosure is not limited to the aforementioned application. The grip structure 100 of the present disclosure can be used in any device or equipment that focuses on one-way shock absorption to improve controllability and cushioning.

On the other hand, the overall thickness of the grip structure 100 also affects the grip feeling of the user and the control of the user over the grip structure 100. In greater detail, in order to prevent the grip structure 100 from being too thick or too thin, the diameter, the thickness of each element of the grip structure 100 have relevant range restrictions. In order to ensure the grip feeling and controllability of the grip structure 100, the diameter of the inner tube 110 can range from 22.3 mm to 27.2 mm, the thickness of the cushioning layer 120 can range from 1.5 mm to 20 mm, and the thickness of the gripping layer 130 can range from 0.1 mm to 3 mm.

Due to the limited size in use, most of the conventional grip structures are adjusted based on the softness and hardness of the selected material to achieve the shock-absorbing effect, but this approach still has its limits. The grip structure of the present disclosure is adjusted based on the structural configuration. The volume of the cushioning layer of the grip structure of the present disclosure is increased by the eccentric design, so that better cushioning and shock-absorbing performance can be obtained compared with the conventional grip structure without significantly changing the size.

To sum up, the grip structure of the present disclosure increases the volume of the cushioning layer by the eccentric design. Furthermore, the grip structure of the present disclosure can achieve shock-absorbing and lightweight effects by the material selection of the cushioning layer and the gripping layer, thereby achieving the goal of increasing the grip comfort of the user.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A grip structure, comprising:
   an inner tube;
   a cushioning layer connected to an outer surface of the inner tube, wherein the cushioning layer is made of a soft material with low hardness;
   a gripping layer connected to an outer surface of the cushioning layer, wherein the gripping layer is made of a soft material with high hardness; and
   a locking component disposed at one end of the grip structure and connected to the inner tube, wherein the locking component is configured to connect the grip structure to an external device;
   wherein a section of the grip structure is an eccentric, at least a part of the cushioning layer protrudes from the gripping layer, a hardness of the cushioning layer is less than a hardness of the gripping layer, the gripping layer has at least one exposed surface, and the cushioning layer is exposed on the at least one exposed surface of the gripping layer.

2. The grip structure of claim 1, wherein a diameter of the inner tube ranges from 22.3 mm to 27.2 mm.

3. The grip structure of claim 1, wherein a thickness of the cushioning layer ranges from 1.5 mm to 20 mm.

4. The grip structure of claim 1, wherein a thickness of the gripping layer ranges from 0.1 mm to 3 mm.

5. The grip structure of claim 1, wherein a material of the inner tube is an engineering plastic or a metal.

6. The grip structure of claim 1, wherein a material of the cushioning layer is a low hardness thermoplastic rubber.

7. The grip structure of claim 1, wherein a material of the gripping layer is a high hardness thermoplastic rubber.

8. The grip structure of claim 1, wherein an eccentric distance of the grip structure is 0.5 mm to 5 mm.

9. The grip structure of claim 1, wherein the cushioning layer has a first side and a second side, and a thickness of the cushioning layer gradually increases from the second side to the first side.

10. The grip structure of claim 9, wherein the gripping layer includes a first gripping part and a second gripping part, the first gripping part is disposed on the first side, and the second gripping part is disposed on the second side.

11. The grip structure of claim 10, wherein the cushioning layer has a hollow part formed on the second side of the cushioning layer, and the second gripping part is disposed on the hollow part and attached to the outer surface of the inner tube.

12. The grip structure of claim 10, wherein the first gripping part is attached to the outer surface of the cushioning layer.

13. The grip structure of claim 1, wherein the inner tube has a connecting portion protruding from one end of the cushioning layer, and the locking component is sleeved on the connecting portion.

\* \* \* \* \*